(12) United States Patent
Sha et al.

(10) Patent No.: US 10,934,046 B2
(45) Date of Patent: Mar. 2, 2021

(54) VACUUM BLOOD COLLECTION TUBE LABELING MACHINE AND CONVEYING AND LABELING METHOD FOR VACUUM BLOOD COLLECTION TUBE

(71) Applicant: SHANGHAI CHUANGSIJIE MEDICAL TECHNOLOGY CO., LTD., Shanghai (CN)

(72) Inventors: Quan Sha, Shanghai (CN); Jian Sun, Shanghai (CN); Lele Fan, Shanghai (CN)

(73) Assignee: SHANGHAI CHUANGSIJIE MEDICAL TECHNOLOGY CO., LTD., Shanghai (CN)

( * ) Notice: Subject to any disclaimer, the term of this patent is extended or adjusted under 35 U.S.C. 154(b) by 92 days.

(21) Appl. No.: 15/774,009

(22) PCT Filed: Mar. 1, 2017

(86) PCT No.: PCT/CN2017/075340
§ 371 (c)(1),
(2) Date: May 6, 2018

(87) PCT Pub. No.: WO2017/148392
PCT Pub. Date: Sep. 8, 2017

(65) Prior Publication Data
US 2018/0370670 A1    Dec. 27, 2018

(30) Foreign Application Priority Data

Mar. 2, 2016  (CN) .......................... 201610118864.2
Apr. 1, 2016  (CN) .......................... 201620270575.X
Jun. 30, 2016  (CN) .......................... 201620680613.9

(51) Int. Cl.
*B65C 9/02*  (2006.01)
*B65C 3/08*  (2006.01)
(Continued)

(52) U.S. Cl.
CPC .............. *B65C 9/02* (2013.01); *B01L 3/5082* (2013.01); *B01L 3/5453* (2013.01); *B65C 3/08* (2013.01);
(Continued)

(58) Field of Classification Search
CPC .... B65C 3/14; B65C 9/02; B65C 9/14; B01L 3/5453
See application file for complete search history.

(56) References Cited

U.S. PATENT DOCUMENTS

2012/0304596 A1* 12/2012 Koike .................... B65C 1/047
                                                            53/136.1
2014/0157731 A1*  6/2014 Perazzo ................. G01N 21/84
                                                            53/473
2016/0075462 A1*  3/2016 Kang ........................ B01L 9/06
                                                            156/576

FOREIGN PATENT DOCUMENTS

CN    203767613 U    8/2014
CN    203959106   * 11/2014 ............. B65G 11/02
(Continued)

*Primary Examiner* — Philip C Tucker
*Assistant Examiner* — John Blades
(74) *Attorney, Agent, or Firm* — Global IP Services; Tianhua Gu (57) ABSTRACT

A vacuum blood collection tube labeling machine and a conveying and labeling method for a vacuum blood collection tube. The machine includes: a loading part of a vacuum blood collection tube, including a plurality of loading slideways disposed in parallel, each of the loading slideways includes an inclined segment and a horizontal segment extending forward from a bottom end of the inclined segment; a label printing part, including a label printer and a output channel of the vacuum blood collection tube connected to the label printer; and a robotic arm, used for grabbing and lifting up a vacuum blood collection tube located on the horizontal segment and transferring the (Continued)

vacuum blood collection tube to the label printer. A method for grabbing the vacuum blood collection tube, moving direction and track of grabbing the vacuum blood collection tube, the robotic arm includes a grabbing mechanism and a movement control assembly for driving the grabbing mechanism.

11 Claims, 10 Drawing Sheets

(51) Int. Cl.
 *B65G 47/90* (2006.01)
 *B01L 3/00* (2006.01)
 *B65C 9/26* (2006.01)
 *G01N 35/00* (2006.01)

(52) U.S. Cl.
 CPC ............... *B65C 9/26* (2013.01); *B65G 47/90* (2013.01); *G01N 35/0099* (2013.01); *G01N 35/00732* (2013.01); *B01L 2300/021* (2013.01); *B01L 2300/06* (2013.01); *B01L 2300/0832* (2013.01); *G01N 2035/00861* (2013.01)

(56) References Cited

FOREIGN PATENT DOCUMENTS

| | | |
|---|---|---|
| CN | 104554849 A | 4/2015 |
| CN | 204453789 U | 7/2015 |
| CN | 105197325 A | 12/2015 |
| CN | 205470190 U | 8/2016 |
| CN | 205554831 U | 9/2016 |
| CN | 205837984 U | 12/2016 |

* cited by examiner

VACUUM BLOOD COLLECTION TUBE LABELING MACHINE AND CONVEYING AND LABELING METHOD FOR VACUUM BLOOD COLLECTION TUBE

CROSS REFERENCE TO RELATED PATENT APPLICATION

The present application is the US national stage of PCT/CN2017/075340 filed on Mar. 1, 2017, which claims the priorities of CN201610118864.2 filed on Mar. 2, 2016, CN201620270575.X filed on Apr. 1, 2016 and CN201620680613.9 filed Jun. 30, 2016, which applications are incorporated herein by reference.

TECHNICAL FIELD

The present invention relates to technical field of vacuum blood collection tube printing and labeling, and in particular, to a vacuum blood collection tube labeling machine and a conveying and labeling method for a vacuum blood collection tube.

BACKGROUND

In a hospital, when a vacuum blood collection tube is used to collect blood or body fluids of a patient, a paper label including information such as the name, a barcode, and blood test items of a patient needs to be labeled on the vacuum blood collection tube. At present, there are two labeling methods: a manual labeling method and an automatic mechanical labeling method. The manual labeling method wastes time and energy and has poor sticking consistency. The inconsistent labeling results in incapability of recognition by a subsequent testing device and a potential risk of medical accidents. There are three manners for a vacuum blood collection tube automatic labeling machine to load and label a vacuum blood collection tube in the market. The first is a slideway-funnel-type manner. That is, vacuum blood collection tubes are arranged and loaded in inclined slideways. The vacuum blood collection tubes directly slide downward to a label printer through a funnel under the force of gravity and a barcode label of a patient is stuck to the vacuum blood collection tube. The second is a drawer-type manner. That is, a vacuum blood collection tube is manually placed in a box in a drawer form, and the box enters a label printer in a mechanical transmission manner to stick a barcode label of a patient. The third is a robotic arm grabbing manner. That is, a vacuum blood collection tube is loaded by a plastic tray originally packaged by a vacuum blood collection tube manufacturer. The entire tray is placed in the automatic labeling machine, and a robotic arm is used to grab the vacuum blood collection tube and move the same to a label printer to stick a barcode label of a patient.

The slideway-funnel-type manner has advantages such as a simple structure and low costs. However, because the existing slideway-funnel-type products in the market use a funnel-guide sliding manner to convey a vacuum blood collection tube from an inclined slideway to a printer, it is extremely difficult to control a posture and position of the vacuum blood collection tube during sliding. This results in an uncertain state of the vacuum blood collection tube sliding into the printer. Therefore, faults such as failing to slide and fall in place and tube blockage easily occur. The slideway-funnel-type labeling machine has poor reliability and few slideways, usually fewer than five channels. The robotic arm grabbing manner has advantages such as a high degree of automation, a large loading capacity, and high efficiency and reliably, but has high costs, and the machine is large in volume. In addition, because of the high degree of automation, maintenance work is complex, and professionals are required for maintenance. Moreover, because of the large loading capacity, such a machine is only applicable to large hospitals with many patients.

To ensure the consistency of vacuum blood collection tube labeling and to ensure that an instrument subsequently using a labeled vacuum blood collection tube accurately recognizes label information, a vacuum blood collection tube labeling device that has a small volume and labels consistently and reliably is needed.

SUMMARY

In view of the disadvantages in the prior art described above, an object of the present invention is to provide a vacuum blood collection tube labeling machine and a conveying and labeling method for a vacuum blood collection tube for solving a prior-art problem that a vacuum blood collection tube labeling device has high costs and a large volume, or has a small volume but poor reliability.

To achieve the foregoing object and other related objects, the present invention provides a vacuum blood collection tube labeling machine, comprising: a vacuum blood collection tube loading part, comprising a plurality of loading slideways disposed in parallel, wherein each of the loading slideways comprises an inclined segment and a horizontal segment extending forward from a bottom end of the inclined segment; a label printing part, comprising a label printer and a vacuum blood collection tube output channel connected to the label printer; and a robotic arm used for grabbing and lifting up a vacuum blood collection tube located on the horizontal segment and transferring the vacuum blood collection tube to the label printer, wherein the robotic arm comprises a grabbing mechanism and a movement control assembly for driving the grabbing mechanism.

Preferably, the grabbing mechanism comprises a driving motor, a worm-and-gear mechanism, and two grabbing fingers for grabbing the vacuum blood collection tube, a worm in the worm-and-gear mechanism is connected to the driving motor, and a worm gear in the worm-and-gear mechanism is connected to the two grabbing fingers in a transmission manner.

Preferably, the worm gear is connected to the two grabbing fingers through a rack-and-pinion structure, a pinion in the rack-and-pinion structure is coaxially connected to the worm gear and rotates with the worm gear, the rack-and-pinion structure comprises two racks, the two grabbing fingers are connected to two sliding arms, the two sliding arms are respectively disposed on both sides of the pinion, and one sliding arm is connected to one rack.

Preferably, the two grabbing fingers are both rotationally positioned, a plurality of gear grooves are provided at the circumferential direction of rotational positioning ends of the two grabbing fingers, the gear grooves on the two grabbing fingers are engaged with each other, and one of the two grabbing fingers is coaxially connected to the worm gear and rotates with the worm gear.

Preferably, the grabbing mechanism further comprises a housing for accommodating the worm-and-gear mechanism, the two grabbing fingers extend out from the housing, and the driving motor is fixed on an outer wall of the housing.

Preferably, the vacuum blood collection tube labeling machine further comprises a vacuum blood collection tube lifting rack disposed on one side of the vacuum blood collection tube output channel, the vacuum blood collection tube lifting rack comprises a vacuum blood collection tube tray, an elevator mechanism, and a vacuum blood collection tube outlet disposed at the top of the vacuum blood collection tube lifting rack, and the vacuum blood collection tube tray is connected to the lifting mechanism and moves up and down driven by the lifting mechanism.

Preferably, the vacuum blood collection tube loading part further comprises a loading funnel slidably disposed at the top end of the loading slideway, the loading funnel is capable of sliding in a width direction of all the loading slideways and in a length direction of each loading slideway; and a loading port of the loading funnel is parallel to the loading slideways, a top opening of the loading port is wider than a bottom opening of the loading port, and the width of the bottom opening is greater than the diameter of a cap of a vacuum blood collection tube.

Preferably, the vacuum blood collection tube loading part further comprises a vacuum blood collection tube fixing plate spanning above the bottom ends of the inclined segments of all the loading slideways.

Preferably, a surface of the vacuum blood collection tube fixing plate is parallel to an inclined surface of the loading slideway, and vacuum blood collection tube fixing grooves in one-to-one correspondence with all the loading slideways are provided on one side of the vacuum blood collection tube fixing plate towards the horizontal segment.

Preferably, a color recognizer for detecting the color of a cap on the vacuum blood collection tube is provided on the grabbing mechanism.

Preferably, the movement control assembly comprises a horizontal guide rail disposed horizontally and a vertical guide rail slidable along the horizontal guide rail, and the grabbing mechanism is slidably disposed on the vertical guide rail.

Preferably, the vacuum blood collection tube output channel is an inclined channel with a tilt angle of 15° to 60°.

Preferably, a tilt angle of the inclined segment of the loading slideway is 10° to 50°.

The present invention further provides a conveying and labeling method for a vacuum blood collection tube, comprising the following steps:

1) loading the vacuum blood collection tube, the vacuum blood collection tube sliding from an inclined segment of a loading slideway to a horizontal segment of the loading slideway when being loaded;

2) moving a grabbing mechanism on a robotic arm to a vacuum blood collection tube to be labeled at the horizontal segment, wherein the grabbing mechanism grips and lifts up the vacuum blood collection tube to be labeled until the vacuum blood collection tube to be labeled is lifted away from the horizontal segment of the loading slideway;

3) integrally moving the grabbing mechanism and the vacuum blood collection tube to be labeled to a label printer; and 4) placing, by the grabbing mechanism, the vacuum blood collection tube to be labeled into the label printer to complete label printing, wherein the labeled vacuum blood collection tube is output from the vacuum blood collection tube output channel.

Preferably, in the step 3), the grabbing mechanism and the vacuum blood collection tube to be labeled are integrally moved along a horizontal direction, a vertical direction, or a curve track to the label printer.

As described above, the vacuum blood collection tube labeling machine and the conveying and labeling method for a vacuum blood collection tube according to the present invention have the following beneficial effects: the vacuum blood collection tube labeling machine uses a structure combining the slideway-type vacuum blood collection tube loading part with the robotic arm to arrange and load the vacuum blood collection tubes in the inclined segments and the horizontal segments of the inclined slideways, and the robotic arm moves the vacuum blood collection tube in the horizontal segment to the label printer after grabbing and lifting up the same, so as to print and stick a label of a patient. The present invention has advantages such as low costs, easy operations, and high efficiency and reliability. In addition, the present invention is applicable to large, medium, and small hospitals, and in particular, to medium and small hospitals. The vacuum blood collection tube labeling machine may be used in a stand-alone mode, or may be connected in series with a multiple of vacuum blood collection tube labeling machines to cooperate with an intelligent vacuum blood collection management system to connect to a hospital HIS and LIS. The vacuum blood collection tube labeling machine has functions such as full-automatic robotic arm carrying and intelligent edge-tracking labeling.

DESCRIPTIONS OF COMPONENT LABELS

1 Loading part of vacuum blood collection tube
11 Loading slideway
110 Horizontal segment
111 Inclined segment
2 Vacuum blood collection tube
3 Vertical guide rail
4 Grabbing mechanism 41 Grabbing finger
42 Driving motor
43 Worm gear
44 Worm
45 Sliding arm
46 Pinion
47 Rack
48 Sliding rail
49 Gear slot
5 Horizontal guide rail
6 Label printer
61 Swing arm
8 Lifting frame of vacuum blood collection tube
81 Catch tray of vacuum blood collection tube
82 Output port of vacuum blood collection tube
83 Lifting driving mechanism
84 Vertical guide rod
85 Slide rest
86 Tray of vacuum blood collection tube
9 Output channel of vacuum blood collection tube
10 Test tube box
12 Locating plate of vacuum blood collection tube
121 Locating slot of vacuum blood collection tube
13 Loading funnel
131 Loading port
14 Supporting frame

DETAILED DESCRIPTION OF THE
PREFERRED EMBODIMENTS

Implementations of the present invention are described below with reference to specific embodiments, and a person skilled in the art can easily understand other advantages and effects of the present invention based on content disclosed by this specification.

Refer to FIG. 1 to FIG. 12. It should be noted that the structures, proportions, sizes, and the like shown in the accompanying drawings of this specification are merely used for cooperating with the content disclosed by this specification for understanding and reading by a person skilled in the art and are not intended to set an limited condition for implementing the present invention. Therefore, the structures, proportions, sizes, and the like do not have substantial meanings technically. Any modification of the structures, change of a proportion relationship, or adjustment of the sizes without affecting the effects that can be generated and the objective that can be achieved by the present invention shall still fall within the scope that can be covered by the technical content disclosed by the present invention. In addition, the terms such as "up", "down", "left", "right", "middle", and "one" cited in this specification are merely for convenience of description and are not intended to limit the implementable scope of the invention, and a change or adjustment of a relative relationship thereof without a substantial technical content change shall also be considered as the implementable scope of the present invention.

Figure 1:
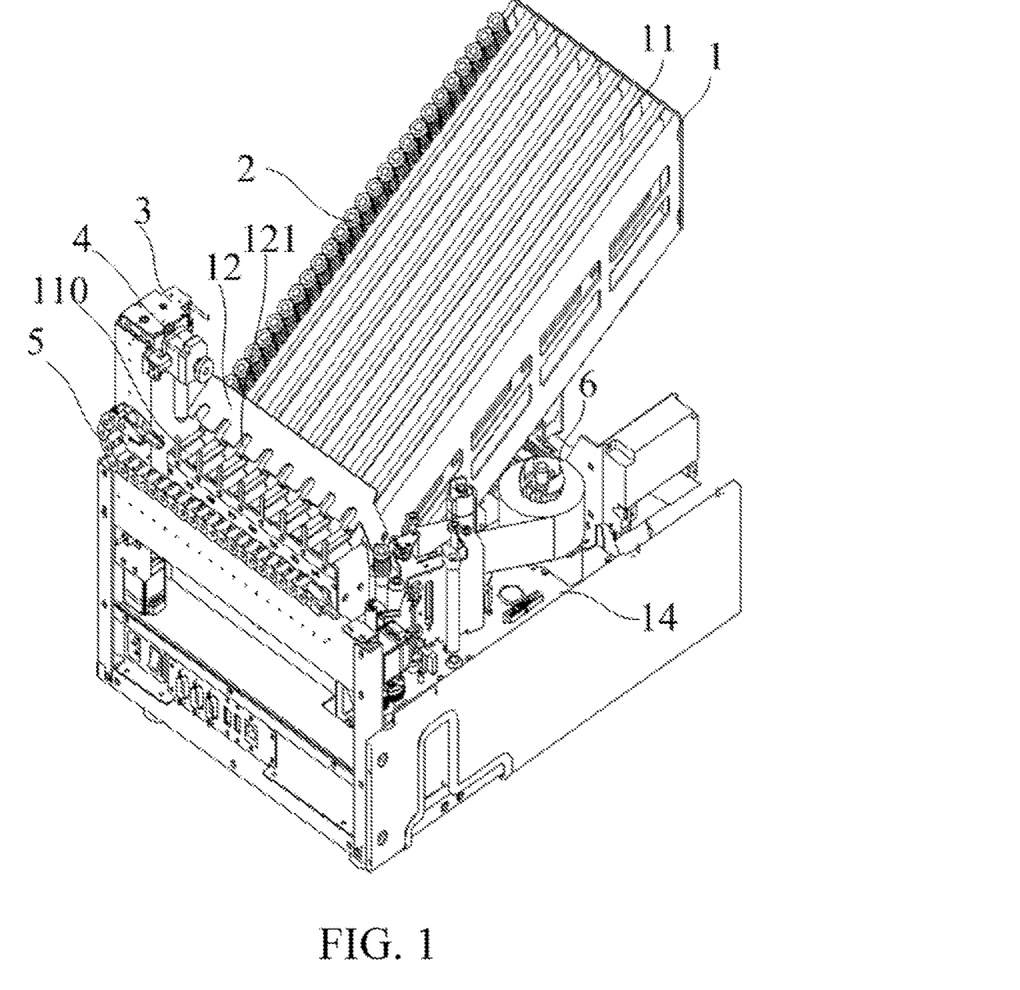
FIG. 1 is a schematic diagram of an embodiment of a vacuum blood collection tube labeling machine according to the present invention.
Figure 2:
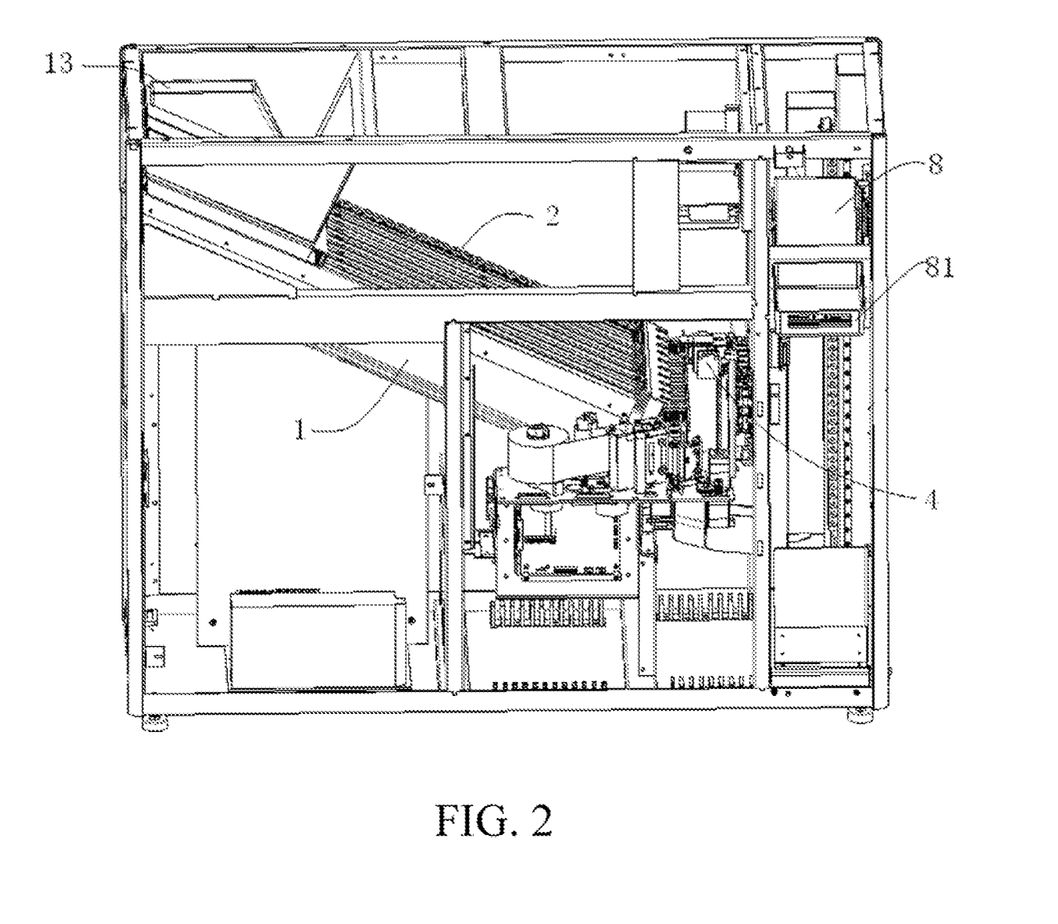
FIG. 2 is a schematic diagram of a second embodiment of a vacuum blood collection tube labeling machine according to the present invention.
Figure 3:
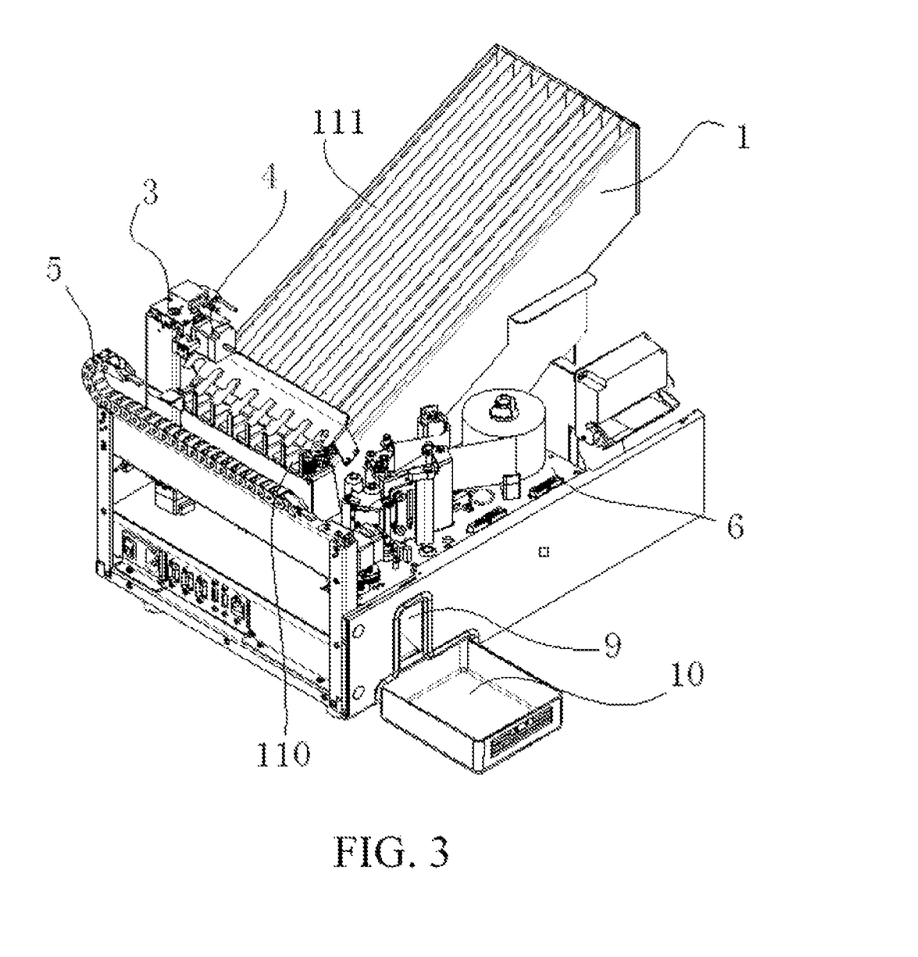
FIG. 3 is a schematic diagram of a third embodiment of a vacuum blood collection tube labeling machine according to the present invention.

As shown in FIG. 1, FIG. 2, and FIG. 3, the present invention provides a vacuum blood collection tube labeling machine, comprising: a loading part 1 of a vacuum blood collection tube, comprising a plurality of loading slideways 11 disposed in parallel, wherein each of the loading slideways 11 comprises an inclined segment 111 and a horizontal segment 110 extending forward from a bottom end of the inclined segment; a label printing part, comprising a label printer 6 and an output channel 9 of the vacuum blood collection tube connected to the label printer; and a robotic arm, used for grabbing and lifting up a vacuum blood collection tube 2 located on the horizontal segment 110 and transferring the vacuum blood collection tube 2 to the label printer 6, wherein the robotic arm comprises a grabbing mechanism 4 and a movement control assembly for driving the grabbing mechanism. In the present invention, a structure combining the slideway-type loading part 1 of the vacuum blood collection tube with the robotic arm is used to arrange and load vacuum blood collection tubes 2 in the inclined segments 111 and the horizontal segments 110. During operation, the vacuum blood collection tube 2 automatically slides down along the loading slideway. The robotic arm grabs and lifts up the vacuum blood collection tube 2 in the horizontal segment to the label printer 6 so as to print and stick a patient label. The present invention has advantages such as low costs, easy operations, and high efficiency and reliability.

The vacuum blood collection tube labeling machine shown in FIG. 1 and FIG. 3 may be placed on a table. A labeled vacuum blood collection tube 2 is directly output through the output channel 9 of the vacuum blood collection tube and is picked up and used by medical staff. To collect the labeled vacuum blood collection tubes more conveniently, as shown in FIG. 3, a test tube box 10 is placed on one side of the output channel 9 of the vacuum blood collection tube, and the labeled vacuum blood collection tubes are collected into the test tube box 10 for ease of carrying and use.

In order to smoothly output the labeled vacuum blood collection tubes, the output channel 9 of the vacuum blood collection tube is an inclined channel. As shown in FIG. 3, a tilt angle of the inclined channel is 15° to 60°.

Figure 6:
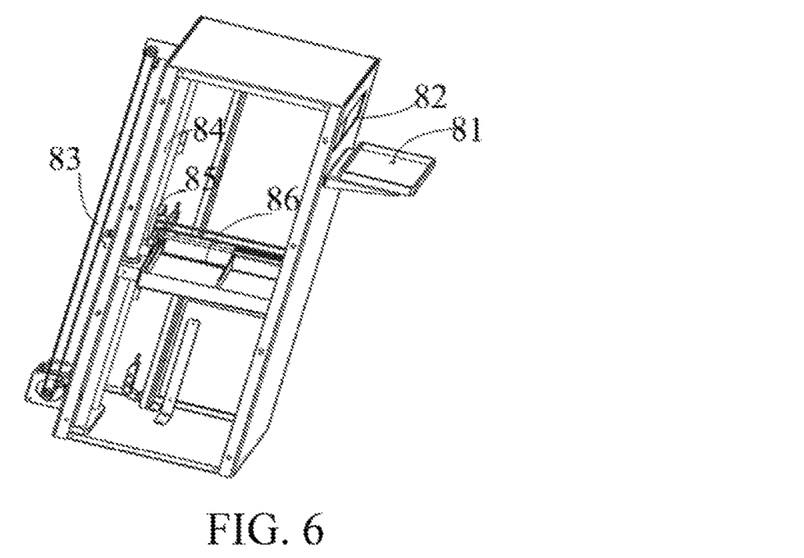
FIG. 6 is a schematic diagram of a vacuum blood collection tube lifting rack according to the present invention.

As shown in FIG. 2, the vacuum blood collection tube labeling machine according to this embodiment further comprises a lifting frame 8 of vacuum blood collection tube disposed on one side of the output channel of the vacuum blood collection tube. As shown in FIG. 6, the lifting frame 8 of the vacuum blood collection tube comprises a tray 86 of the vacuum blood collection tube, a lifting mechanism, and an output port 82 of the vacuum blood collection tube disposed at the top of the lifting frame 8 of the vacuum blood collection tube. The tray 86 of the vacuum blood collection tube is used for receiving a labeled vacuum blood collection tube output by the output channel 9 of the vacuum blood collection tube, is connected to the lifting mechanism, and moves up and down driven by the lifting mechanism.

The lifting mechanism according to this embodiment comprises a lifting driving mechanism 83, a vertical guide rod 84, and a slide rest 85 slidably disposed on the vertical guide rod. The tray 86 of the vacuum blood collection tube is disposed on the slide rest 85, and the lifting driving mechanism 83 is connected to the slide rest 85 to drive the slide rest 85 to slide up and down along the vertical guide rod 84, so as to lift the vacuum blood collection tube up and down for transmission. The lifting driving mechanism 83 according to this embodiment uses a structure combining a driving motor and a timing belt and pulley. The lifting mechanism according to the present invention may alternatively be another mechanism that can implement lifting the tray of the vacuum blood collection tube up and down, for example, a lifting cylinder, which is not described in detail herein. A catch tray 81 of the vacuum blood collection tube may further be disposed below the output port 82 of the vacuum blood collection tube and on an outer side wall of the lifting frame 8 of the vacuum blood collection tube according to this embodiment. After printing a vacuum blood collection tube label, the vacuum blood collection tube labeling machine shown in FIG. 2 can further lift up a labeled vacuum blood collection tube to a required position as needed, so that the vacuum blood collection tube labeling machine according to this embodiment may be adapted to being mounted in a low position.

Figure 7:
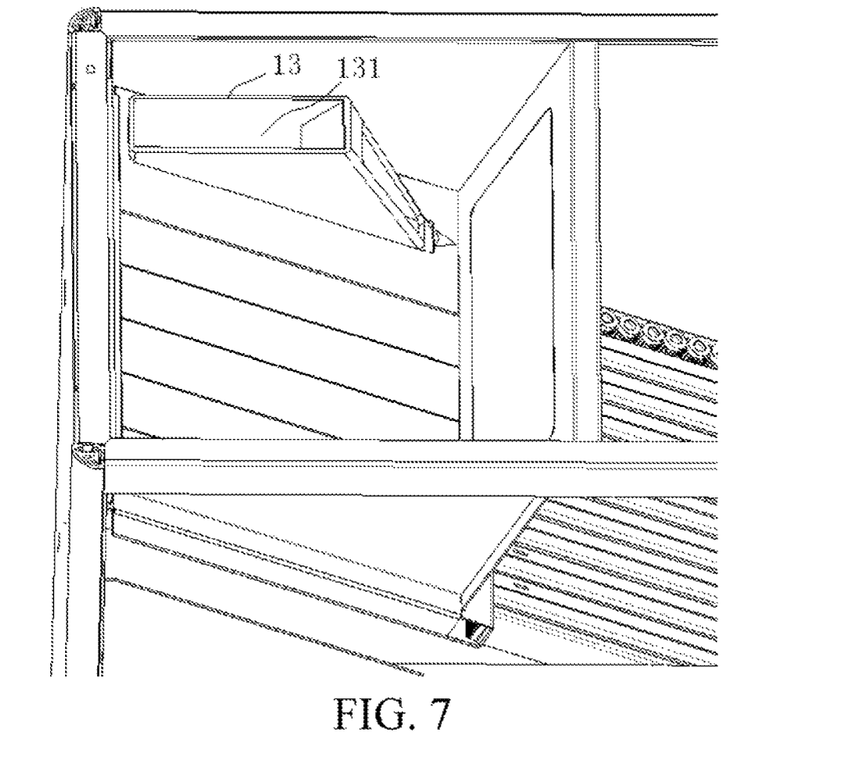
FIG. 7 is a schematic diagram of a loading funnel according to the present invention.

In order to load the vacuum blood collection tube, the loading part 1 of the vacuum blood collection tube according to the present invention further comprises a loading funnel 13 slidably disposed at the top end of the loading slideway. As shown in FIG. 2 and FIG. 7, the loading funnel 13 is capable of sliding in a width direction of all the loading slideways 11 and in a length direction of each loading slideway 11. A loading port 131 of the loading funnel 13 is parallel to the loading slideways 11, a top opening of the loading port 131 is wider than a bottom opening of the loading port, and the width of the bottom opening is greater than the diameter of a cap of a vacuum blood collection tube. In this case, it is convenient to place the vacuum blood collection tube in the loading slideway. Regardless of manners of loading the vacuum blood collection tube, when the vacuum blood collection tube falls into the loading slideway through the loading funnel, the vacuum blood collection tube is in an erect posture. That is, the cap of the vacuum blood collection tube faces upward.

For ease of automatic and slidable loading of the vacuum blood collection tubes and grabbing by the robotic arm, the loading part 1 of the vacuum blood collection tube further comprises a locating plate 12 of the vacuum blood collection tube spanning above the bottom ends of the inclined segments of all the loading slideways 11. As shown in FIG. 1, the vacuum blood collection tube fixing plate may assist in fixing each vacuum blood collection tube. According to this embodiment, the spatial distance between the locating plate 12 of the vacuum blood collection tube and a top end of the cap of the vacuum blood collection tube in the loading slideway 11 is 0.5 mm to 20 mm. When the grabbing mechanism 4 grabs and lifts up the first vacuum blood collection tube in the horizontal segment, the locating plate 12 of the vacuum blood collection tube may control the second vacuum blood collection tube not to be lifted, so as to implement a function of fixing the second vacuum blood collection tube. A surface of the vacuum blood collection tube fixing plate 12 is parallel to an inclined surface of the loading slideway, and one side of the locating plate of the vacuum blood collection tube facing the horizontal segment 110 has locating slots 121 of the vacuum blood collection tube in one-to-one correspondence with all the loading slideways. In this embodiment, the locating plate 12 of vacuum blood collection tube is used to assist in fixing vacuum blood collection tubes 2 at tail ends of the loading slideways, so as to better assist the robotic arm in grabbing the vacuum blood collection tubes.

In the present invention, there may be 1 to n loading slideways 11 in parallel (which may be increased or reduced as needed) that load a plurality of different vacuum blood collection tubes at the same time. Each loading slideway may load 20 to 100 test tubes. A tilt angle of the inclined segment of the loading slideway is 10° to 50°. The vacuum blood collection tube in the inclined segment of the loading slideway 11 automatically slides down to the horizontal segment using the gravity of the vacuum blood collection tube. The vacuum blood collection tube proactively adjusts to a straight posture in advance. The locating plate 12 of the vacuum blood collection tube may be used to assist in fixing the vacuum blood collection tube for grabbing by the robotic arm. The vacuum blood collection tube labeling machine according to the present invention may fix the second vacuum blood collection tube at the tail end by using the locating mechanism 7 of the vacuum blood collection tube and the locating plate 12 of the vacuum blood collection tube at the same time, to improve the accuracy of grabbing by the grabbing mechanism, and ensure that the remaining vacuum blood collection tubes can automatically slide down along the loading slideway and be in a normally standing posture after the first vacuum blood collection tube is grabbed away.

In order to grab a required vacuum blood collection tube as needed, the grabbing mechanism 4 may be provided with a color recognizer for recognizing the color of a cap of a vacuum blood collection tube 2. The color recognizer may use a multi-channel (2 to 8) color sensor. The multi-channel color sensor can intelligently recognize the color of a cap of a vacuum blood collection tube within its measuring range, and send a digital signal received after the recognition to a main controller for controlling the vacuum blood collection tube labeling machine for processing, to finally determine different colors of the vacuum blood collection tubes. Because different colors correspond to different items, a required vacuum blood collection tube can be intelligently grabbed in advance.

The movement control assembly in the present invention comprises a horizontal guide rail 5 disposed horizontally and a vertical guide rail 3 slidable along the horizontal guide rail 5, and the grabbing mechanism 4 is slidably disposed on the vertical guide rail 3. In this way, the grabbing mechanism can move horizontally or be lifted up and down, so that the grabbing mechanism can transfer a grabbed vacuum blood collection tube 2 to the label printer 6. The movement control assembly according to the present invention may alternatively comprise another three-dimensional movement mechanism as long as the following functions are implemented. The grabbing mechanism lifts up a vacuum blood collection tube located at the horizontal segment and grabs the vacuum blood collection tube to the label printer along a horizontal direction, a vertical direction, or a curve track. The robotic arm may be implemented by using movement mechanisms such as a rack-and-pinion mechanism, a timing belt-and-pulley mechanism, a ball screw mechanism, and a screw-rod drive mechanism.

The label printer 6 in the present invention can perform intelligently edge-tracking labeling. The label printer 6 intelligently prints patient information according to an LIS or HIS instruction sent by a hospital system, sticks a label, checks whether a printed barcode is consistent with the LIS or HIS instruction sent by the hospital system, and automatically outputs a tube. The label printer 6 may print 1 or 16 tubes at a time (or print fewer than 100 tubes at a time as needed).

Both the loading part 1 of the vacuum blood collection tube and the label printing part according to the present invention are disposed on a supporting frame 14, as shown in FIG. 1, and the label printing part is disposed on one side of the loading part 1 of the vacuum blood collection tube. In this way, the vacuum blood collection tube labeling machine can serve as a whole to fix main components on the supporting frame for ease of moving and use, making the volume of the vacuum blood collection tube labeling machine according to the present invention small and applicable to various hospitals.

Figure 4:
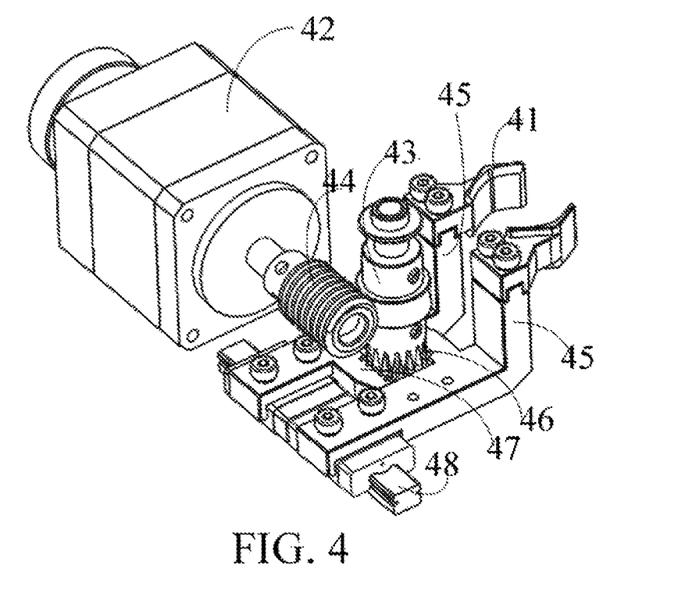
FIG. 4 is a schematic diagram of an embodiment of a grabbing mechanism according to the present invention.
Figure 5:
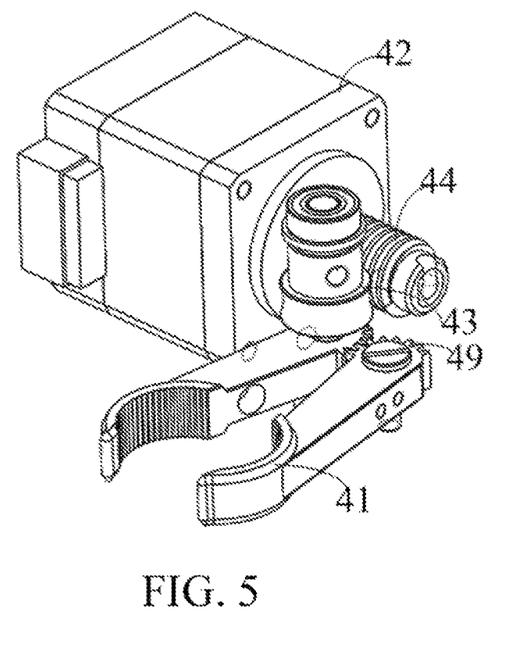
FIG. 5 is a schematic diagram of a second embodiment of a grabbing mechanism according to the present invention.

As shown in FIG. 4 and FIG. 5, the grabbing mechanism 4 comprises a driving motor 42, a worm-and-gear mechanism, and two grabbing fingers 41 for grabbing a vacuum blood collection tube, a worm 44 in the worm-and-gear mechanism is connected to the driving motor 42, and a worm gear 43 in the worm-and-gear mechanism is connected to the two grabbing fingers 41 in a transmission manner. The grabbing mechanism according to this embodiment uses the driving motor 42 to drive, by using the worm-and-gear mechanism, the two grabbing fingers 41 to move, so as to complete grabbing and placing of the vacuum blood collection tubes, and uses the worm-and-gear mechanism to enlarge output power of the driving motor 42 to increase a clamping force of the two grabbing fingers 41. The grabbing fingers 41 may perform slide-proof eight-point clamping, parallel, or hinged grabbing.

FIG. 4 shows a specific embodiment of the grabbing mechanism. The worm gear 43 is connected to the two grabbing fingers 41 by a rack-and-pinion structure, and a pinion 46 in the rack-and-pinion structure is coaxially connected to the worm gear 43 and rotates with the worm gear 43. The rack-and-pinion structure comprises two racks 47, the two grabbing fingers 41 are connected to two sliding arms 45, the two sliding arms 45 are respectively disposed on two sides of the pinions 46, and one sliding arm 45 is connected to one rack 47. In this embodiment, the sliding arms 45 are both slidably disposed on a sliding rail 48. The two racks 47 in the rack-and-pinion structure are disposed between the two sliding arms 45 and are respectively connected to the two sliding arms 45. In this embodiment, the rack-and-pinion structure is used to implement drive-connection between the worm gear 43 and the two grabbing fingers 41. In this embodiment, the driving motor 42 is a stepper motor. The stepper motor rotates forward to drive the worm-and-gear mechanism and a rack-and-pinion mechanism to move, so that the two grabbing fingers 41 connected to the sliding arms 45 move toward each other to implement an action of grabbing a vacuum blood collection tube. After the grabbing mechanism 4 grabs the vacuum blood collection tube, when the vacuum blood collection tube needs to be put down, the stepper motor rotates backward to drive the worm-and-gear mechanism and a rack-and-pinion structure to move, so that the two grabbing fingers 41 connected to the sliding arms 45 move away from each other and implement an action of releasing and placing the vacuum blood collection tube.

FIG. 5 shows another specific embodiment of the grabbing mechanism. In this embodiment, the two grabbing fingers are of a fulcrum rotation open/closed type. The two grabbing fingers 41 are both rotationally positioned, a plurality of gear slots 49 are provided at the circumferential direction of rotational positioning ends of the two grabbing fingers 41. The gear slots 49 on the two grabbing fingers 41 are engaged with each other, and one of the two grabbing fingers 41 is coaxially connected to the worm gear 43 and rotates with the worm gear 43. The driving motor according to this embodiment may alternatively be a stepper motor. In this embodiment, the two grabbing fingers 41 are rotationally positioned and engaged with each other by using gear slots 49. The worm gear 43 and one of the grabbing fingers 41 are coaxially disposed. When the stepper motor rotates forward, the worm gear rotates to drive the coaxial grabbing finger 41 to rotate, so that the two grabbing fingers firmly clamp a vacuum blood collection tube to implement an action of grabbing the vacuum blood collection tube. When the vacuum blood collection tube needs to be put down, the stepper motor rotates backward, and the worm gear rotates to drive the coaxial grabbing finger 41 to rotate, so that the two grabbing fingers 41 release a vacuum blood collection tube to implement an action of placing the vacuum blood collection tube.

For ease of mounting and use, the grabbing mechanism 4 further comprises a housing for accommodating the worm-and-gear mechanism (not shown). The two grabbing fingers 41 extend out from the housing and the driving motor 42 is fixed on an outer wall of the housing to enable the entire grabbing mechanism 5 to become a whole assembly. For ease of control and use, the driving motor is connected to a controller in the vacuum blood collection tube labeling machine.

Figure 8:
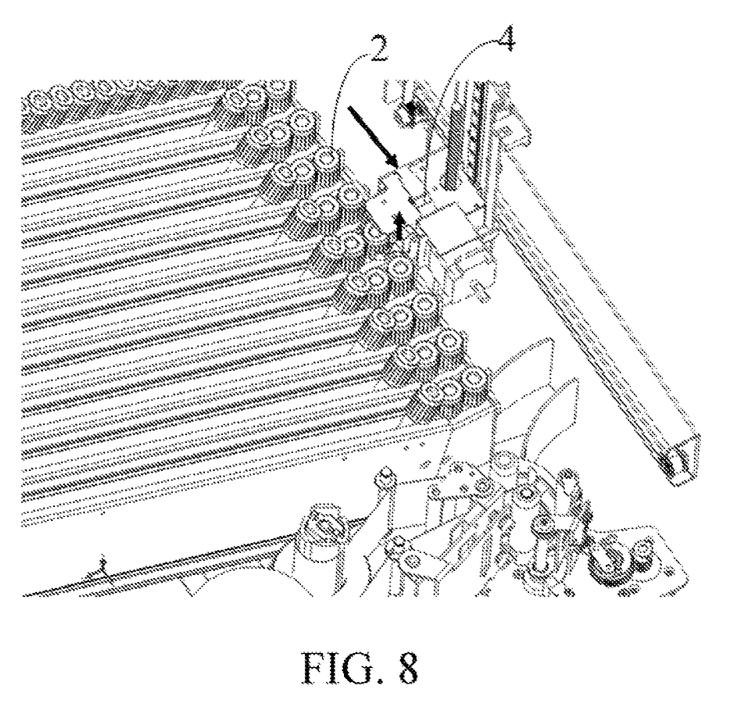
FIG. 8 is a state diagram showing that a grabbing mechanism grabs a blood collection tube according to the present invention.
Figure 9:
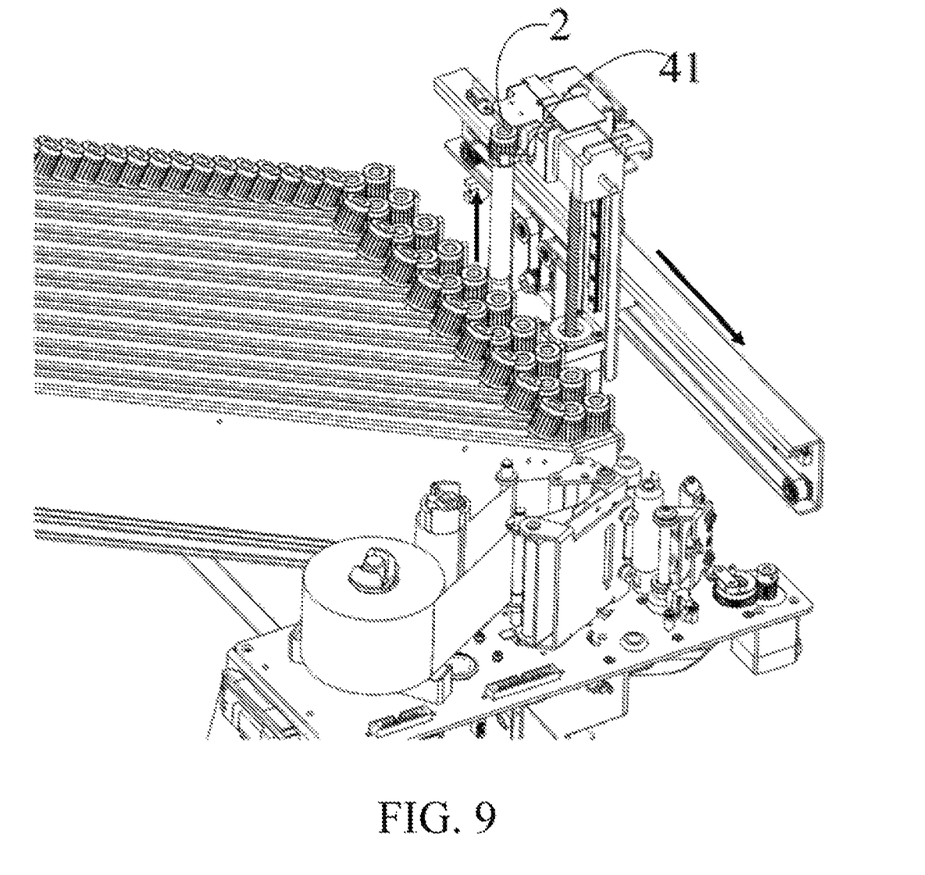
FIG. 9 is a state diagram showing that a grabbing mechanism lifts up a blood collection tube according to the present invention.
Figure 10:
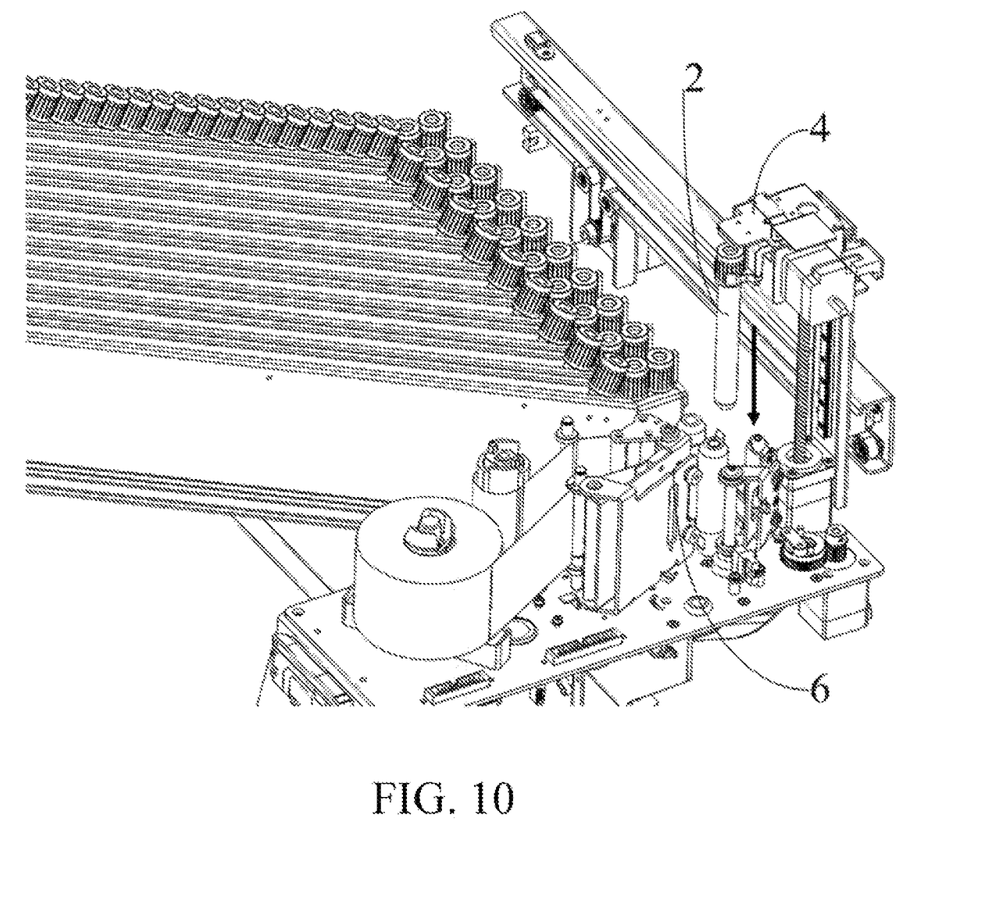
FIG. 10 is a state diagram showing that a grabbing mechanism moves a blood collection tube to a label printer according to the present invention.
Figure 11:
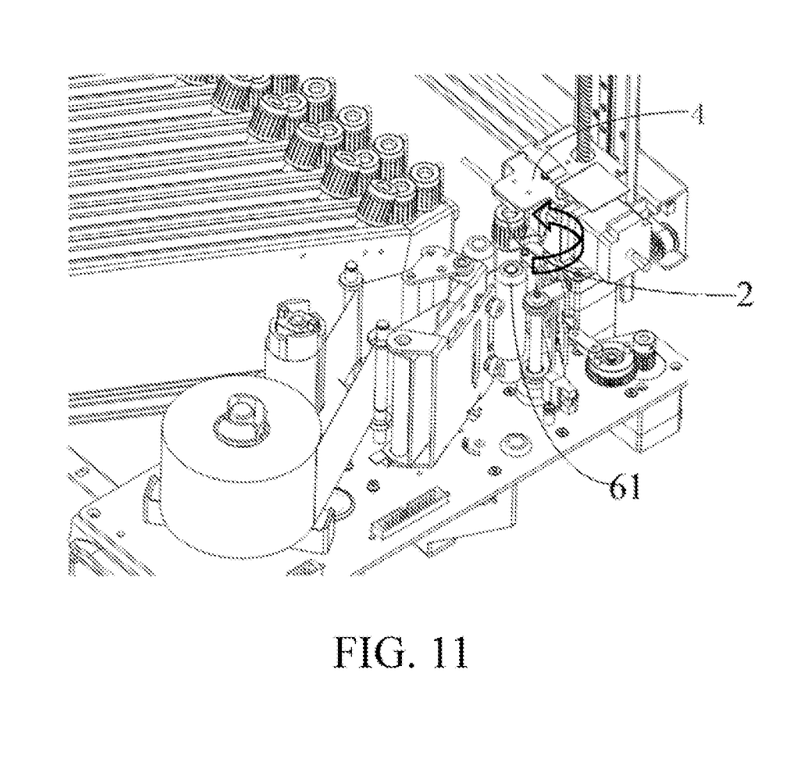
FIG. 11 is a state diagram showing that a grabbing mechanism places a blood collection tube to a printing position according to the present invention.
Figure 12:
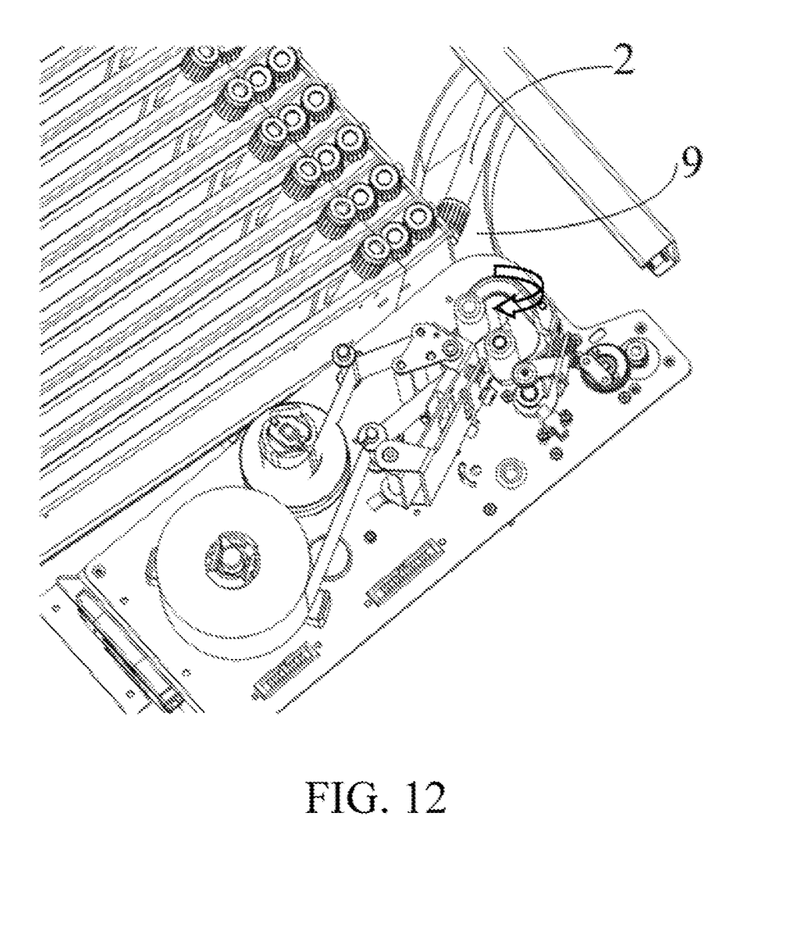
FIG. 12 is a diagram of output state of a labeled blood collection tube according to the present invention.

As shown in FIG. 8 to FIG. 12, a specific working process of the vacuum blood collection tube labeling machine according to the present invention is as follows:

The grabbing mechanism 4 moves to a specified position and prepares for an action. As shown in FIG. 8, the grabbing mechanism according to this embodiment moves to the grabbing position in an arrow direction in FIG. 8, and the two grabbing fingers in the grabbing mechanism 4 clamp a vacuum blood collection tube 2. The grabbing mechanism performs a lifting movement driven by the movement control assembly. As shown in FIG. 9, the grabbing mechanism 4 and the vacuum blood collection tube 2 clamped by the grabbing fingers 41 are integrally lifted to a certain height, and in this embodiment, an upward arrow in FIG. 9 is a lifting direction of the grabbing mechanism. The movement control assembly drives the grabbing mechanism 4 and the vacuum blood collection tube 2 to translate to the label printer 6, and a horizontal arrow in FIG. 9 is a moving direction in which the grabbing mechanism 4 and the vacuum blood collection tube 2 move to the label printer 6. As shown in FIG. 10, the grabbing mechanism 4 moves down in an arrow direction in FIG. 10 driven by the movement control assembly until it places the vacuum blood collection tube 2 between swing arms 61 of the label printer 6. The vacuum blood collection tube 2 is clamped by the swing arms 61. An arrow direction in FIG. 11 is an action direction in which the swing arms clamp the vacuum blood collection tube 2. The grabbing mechanism 4 releases the vacuum blood collection tube 2 and returns to an initial position. The label printer 6 begins to perform label printing on the vacuum blood collection tube 2. After completing labeling, the swing arms open to release the vacuum blood collection tube. As shown in FIG. 12, an arrow direction in FIG. 12 is a direction in which the swing arms release the vacuum blood collection tube. The labeled vacuum blood collection tube 2 slides out of the vacuum blood collection tube output channel 9. In this way, grabbing, conveying, label printing, and outputting of a vacuum blood collection tube are completed.

The present invention further provides a conveying and labeling method for a vacuum blood collection tube. The method may be implemented by using the foregoing vacuum blood collection tube labeling machine according to the present invention. That is, a specific working process of the vacuum blood collection tube labeling machine shown in FIG. 8 to FIG. 12 specifically comprises the following steps:

Loading the vacuum blood collection tube, the vacuum blood collection tube sliding from an inclined segment of a loading slideway to a horizontal segment of the loading slideway when being loaded;

Moving a grabbing mechanism on a robotic arm to a vacuum blood collection tube to be labeled at the horizontal segment, wherein the grabbing mechanism grabs and lifts up the vacuum blood collection tube to be labeled until the vacuum blood collection tube to be labeled is lifted away from the horizontal segment of the loading slideway;

Integrally moving the grabbing mechanism and the vacuum blood collection tube to be labeled to a label printer, wherein the grabbing mechanism and the vacuum blood collection tube to be labeled integrally move, driven by a movement control assembly, along a horizontal direction, a vertical direction, or a curve track to the label printer; and Placing, by the grabbing mechanism, the vacuum blood collection tube to be labeled into the label printer to complete label printing, wherein the labeled vacuum blood collection tube is output from the vacuum blood collection tube output channel.

In conclusion, according to the vacuum blood collection tube labeling machine and the conveying and labeling method for a vacuum blood collection tube according to the present invention, the vacuum blood collection tube labeling machine uses a structure combining the slideway-type loading part of the vacuum blood collection tube with the robotic arm to arrange and load vacuum blood collection tubes in the inclined segments and the horizontal segments of the inclined slideways, and the robotic arm moves the vacuum blood collection tube in the horizontal segment to the label printer after grabbing and lifting up the same, so as to print and stick a patient label. The present invention has advantages such as low costs, easy operations, and high efficiency and reliability. Therefore, the present invention effectively overcomes various disadvantages in the prior art and has high industrial utility value.

The foregoing embodiments merely exemplarily describe the principle and effect of the present invention, and are not intended to limit the present invention. Any person skilled in the art can make modifications or changes to the foregoing embodiments without departing from the spirit and scope of the present invention. Therefore, all equivalent modifications or changes made by a person of ordinary skill in the art without departing from the spirit and technical idea disclosed in the present invention shall still be covered by the claims of the present invention.

What is claimed is:

1. A vacuum blood collection tube labeling machine comprising:
    a loading part for a vacuum blood collection tube comprising a plurality of loading slideways disposed in parallel, wherein each of the loading slideways comprises an inclined segment and a horizontal segment extending forward from a bottom end of the inclined segment;
    a label printing part comprising a label printer and a output channel for the vacuum blood collection tube connected to the label printer; and
    a robotic arm used for grabbing and lifting up a vacuum blood collection tube located on the horizontal segment and transferring the vacuum blood collection tube to the label printer, wherein the robotic arm comprises a grabbing mechanism and a movement control assembly for driving the grabbing mechanism;
    wherein the loading part for the vacuum blood collection tube further comprises a loading funnel slidably disposed at top ends of the loading slideways, the loading funnel is capable of sliding in a width direction of all the loading slideways and in a length direction of each loading slideway; and a loading port of the loading funnel is parallel to the loading slideways, a top opening of the loading port is wider than a bottom opening of the loading port, and the width of the bottom opening is greater than the diameter of a cap of a vacuum blood collection tube.

2. The vacuum blood collection tube labeling machine according to claim 1, characterized in that the grabbing mechanism comprises a driving motor, a worm-and-gear mechanism, and two grabbing fingers for grabbing the vacuum blood collection tube, a worm in the worm-and-gear mechanism is connected to the driving motor, and a worm gear in the worm-and-gear mechanism is connected to the two grabbing fingers in a transmission manner.

3. The vacuum blood collection tube labeling machine according to claim 2, characterized in that the worm gear is connected to the two grabbing fingers through a rack-and-pinion structure, a pinion in the rack-and-pinion structure is coaxially connected to the worm gear and rotates with the worm gear, the rack-and-pinion structure comprises two racks, the two grabbing fingers are connected to two sliding arms, the two sliding arms are respectively disposed on both sides of the pinion, and one sliding arm is connected to one rack.

4. The vacuum blood collection tube labeling machine according to claim 2, characterized in that the grabbing mechanism further comprises a housing for accommodating the worm-and-gear mechanism, the two grabbing fingers extend out from the housing, and the driving motor is fixed on an outer wall of the housing.

5. The vacuum blood collection tube labeling machine according to claim 1, characterized in that the vacuum blood collection tube labeling machine further comprises a lifting frame for the vacuum blood collection tube disposed on one side of the output channel for the vacuum blood collection tube, the lifting frame for the vacuum blood collection tube comprises a tray for the vacuum blood collection tube, a lifting mechanism, and a output port for the vacuum blood collection tube disposed at the top of the lifting frame for the vacuum blood collection tube, and the tray for the vacuum blood collection tube is connected to the lifting mechanism and moves up and down driven by the lifting mechanism.

6. The vacuum blood collection tube labeling machine according to claim 1, characterized in that the loading part for the vacuum blood collection tube further comprises a locating plate for the vacuum blood collection tube spanning above the bottom ends of the inclined segments of all the loading slideways.

7. The vacuum blood collection tube labeling machine according to claim 6, characterized in that a surface of the locating plate for the vacuum blood collection tube is parallel to an inclined surface of the loading slideways, and fixing slots for the vacuum blood collection tube in one-to-one correspondence with all the loading slideways are provided on one side of the locating plate for the vacuum blood collection tube towards the horizontal segment.

8. The vacuum blood collection tube labeling machine according to claim 1, characterized in that a color recognizer for detecting the color of a cap on the vacuum blood collection tube is provided on the grabbing mechanism.

9. The vacuum blood collection tube labeling machine according to claim 1, characterized in that the movement control assembly comprises a horizontal guide rail disposed horizontally and a vertical guide rail slidable along the horizontal guide rail, and the grabbing mechanism is slidably disposed on the vertical guide rail.

10. The vacuum blood collection tube labeling machine according to claim 1, characterized in that the output channel for the vacuum blood collection tube is an inclined channel with a tilt angle of 15° to 60°.

11. The vacuum blood collection tube labeling machine according to claim 1, characterized in that a tilt angle of the inclined segment of each loading slideway is 10° to 50°.

* * * * *